May 25, 1965  C. A. LINDBERG  3,185,533
COVER ASSEMBLY

Filed Oct. 1, 1962  10 Sheets-Sheet 1

INVENTOR.
CHARLES A. LINDBERG

BY

May 25, 1965  C. A. LINDBERG  3,185,533
COVER ASSEMBLY
Filed Oct. 1, 1962  10 Sheets-Sheet 6 fig_9_

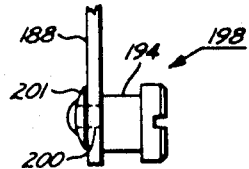
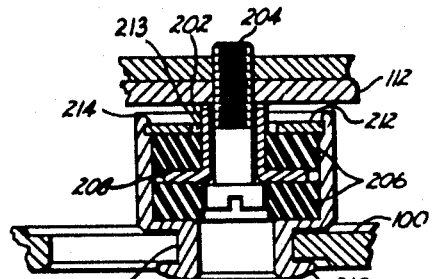
Fig. 11.  Fig. 12.
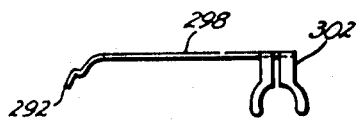
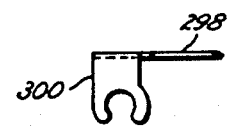
Fig. 13.  Fig. 14.
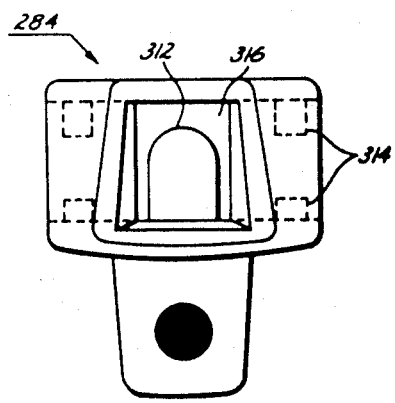
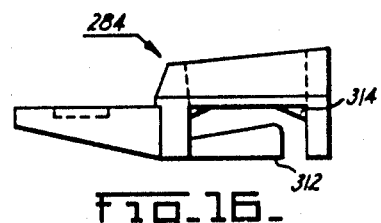
Fig. 15.  Fig. 16.

United States Patent Office 3,185,533
Patented May 25, 1965

3,185,533
COVER ASSEMBLY
Charles A. Lindberg, Lafayette, Calif., assignor to
SCM Corporation, a corporation of New York
Filed Oct. 1, 1962, Ser. No. 227,142
15 Claims. (Cl. 312—208)

The invention relates to a cover assembly, for enclosing an office machine or the like, and more particularly concerns the form of the pieces of the cover assembly, and the manner for holding them together and to the framework of the machine.

In modern office machine practice, an effort is made to arrange cover assemblies to be attractive as well as useful. The appearance of such assemblies is notably enhanced by eliminating exposed screws or their equivalent from the outside surface of the cover, as for example, the five piece interlocking cover assembly disclosed in U.S. Patent No. 2,598,342, issued to Robert E. Boyden on May 27, 1952; however, various problems arise in the design and manufacture of cover assemblies in addition to the elimination of exposed screws as met in the Boyden patent. One such problem is the provision of means to take up any variations in size of the manufactured pieces during assembly so that the cover may be aligned and precisely fitted together. It is desirable to accomplish such assembly and alignment simply, with a minimum of tools and adjustment, and without extensive manipulation of the covers and moving about of the machine. Another problem is minimizing the thought and time required to assemble and disassemble a cover assembly. To overcome these problems, it is desirable to minimize the number and complexity of pieces in a cover assembly consistent with maintaining low manufacturing costs.

In order to obtain a precisely fitting cover design that may be manufactured, assembled and disassembled simply, rapidly, economically and with a minimum of effort, the pieces must be of an uncomplicated design, the number of pieces reduced, the interlocking between pieces simplified, and the necessity for tools eliminated during routine assembly and disassembly.

It is an object of the invention to provide an improved office machine cover assembly.

Another object of the invention is to provide a cover assembly for office machines which may be assembled and disassembled without the use of tools.

Another object is to arrange a cover assembly of several pieces which precisely fit together regardless of irregularities in the size of the covers.

Another object is to provide a precisely fitting, self-aligning office machine cover assembly resiliently held to the machine framework by manually operated stress means.

A further object is to hold a cover assembly to an office machine with manually operated toggle mechanisms.

A still further object is to arrange a cover assembly so that the covers are held in place through interlocking and by toggle and latching mechanisms, without the use of any external or internal screws or the like.

Another object is to arrange and securely attach covers to an office machine without using outwardly exposed visible screws or the like.

Still another object is to economically manufacture a cover assembly with a minimum of forming, bending, and secondary machining operations.

Another object is to arrange an office machine cover assembly of few pieces which may be easily, rapidly and simply assembled, adjusted and disassembled with a minimum of manipulation of the covers or moving about of the machine.

A still further object is the provision of an easily mounted and adjusted carriage faceplate and keyboard cover for a calculating machine.

Another object is to provide an improved roller assembly which may be rapidly and securely fitted into the cover assembly of an office machine.

Another object is to provide an improved arrangement for attaching a decimal point indicator frame to the framework of an office machine.

Still another object is an improvement in the molded form of decimal point indicators including one to resiliently fit over the aforementioned decimal point indicator frame.

A further object is an improved decimal point cover and arrangement thereof on a faceplate of an office machine cover assembly.

According to the invention, a cover assembly is provided which is held together and to an internal machine framework by means of manually operated toggle and latching mechanisms, brackets on the machine framework and on certain ones of said covers, and resilient feet secured to the machine framework and inserted in keyholes in another one of said covers. Improved decimal point indicators and decimal point covers are included in the assembly. The arrangement is such as to enable rapid, routine assembly and disassembly without the use of tools and with a minimum of manipulation of covers, the machine framework or the indicator. Furthermore, a precise self-aligning fit is obtained between the pieces despite irregularities and variations of the parts.

In order that the invention may be practiced by others, it is described in terms of express embodiments, given by way of example only, and with reference to the accompanying drawing in which:

FIG. 11 is a top view of an adjustable fastener;

FIG. 12 is a sectional view of a resilient foot secured to the machine framework;

FIG. 13 is a right side view of a right side member of the decimal point indicator frame;

FIG. 14 is a left side view of a left side member of the decimal point indicator frame;

FIG. 15 is an enlarged top view of a decimal point indicator;

FIG. 16 is an enlarged side view of the decimal point indicator of FIG. 15;

Figure 1:
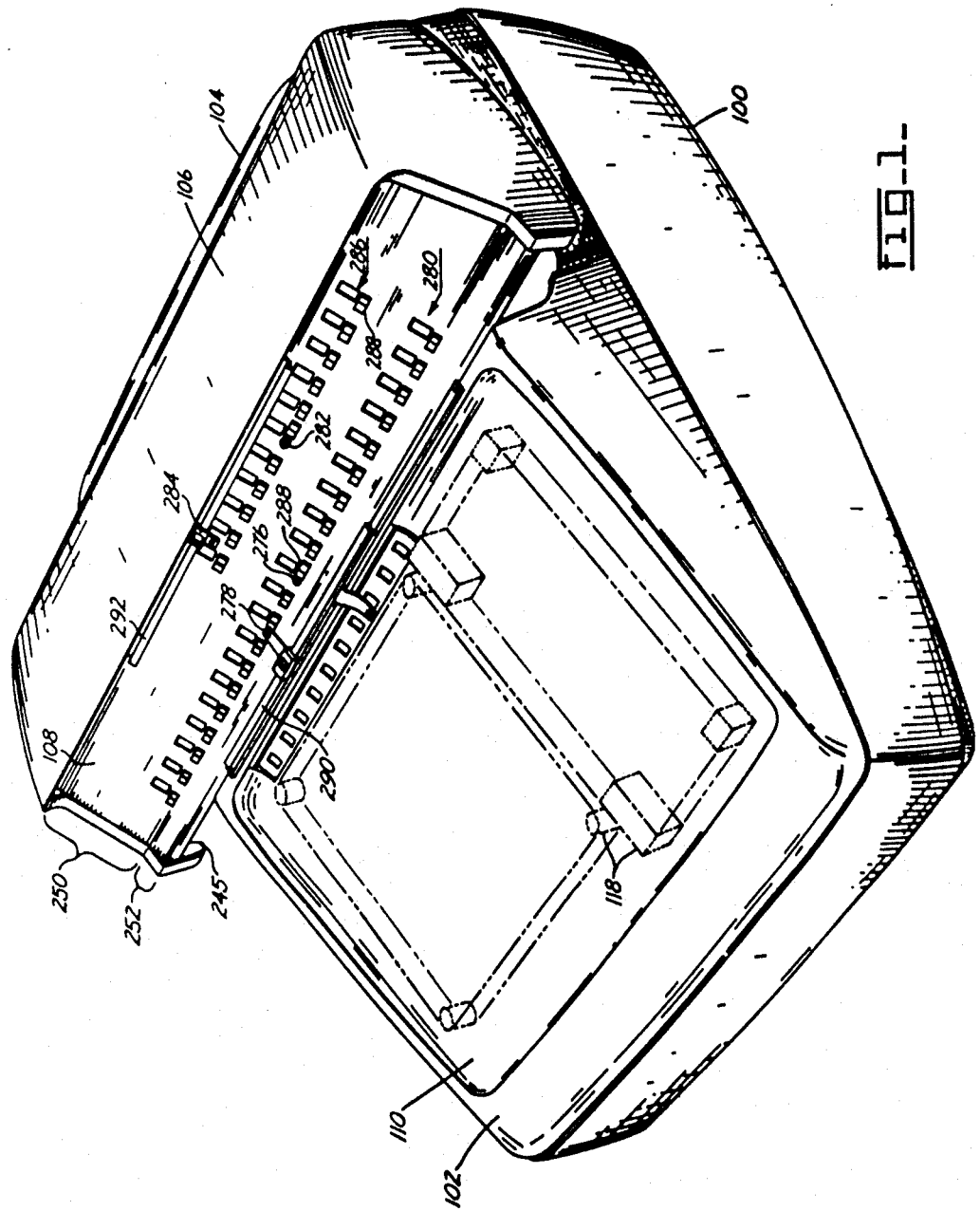
FIG. 1 is an illustration of a calculating machine having a cover assembly comprising a bottom cover, a front cover, a keyboard plate, a faceplate, a back cover, and a carriage cover.

The cover assembly comprises: a one piece casting 100 (FIG. 1) serving as a bottom cover and having upstanding portions on the four sides thereof; a front cover 102 which substantially encloses the keyboard and has depending portions on the front and sides of the machine; a back cover 104; a carriage cover 106; a carriage faceplate 108; and a keyboard plate 110. These covers substantially envelop the machine and are held either to each other or to the framework of the machine without using any exposed screws or other exposed fastening devices.

In the drawing, only such portions of the machine framework are shown as required to fasten various covers thereto, it being understood that the framework of the calculating machine, chosen for a preferred embodiment of the invention, is illustrative only and that such a framework is conventional. The framework comprises a main body portion 112 (FIG. 2) and a carriage portion 114. The main body is regarded as being fixed and the carriage is shifted relative thereto in a conventional manner. All of the parts of the body framework 112 are integral with each other and all of the parts of the carriage framework 114 are integral with each other.

*Front cover*

The covers may be assembled by first attaching the keyboard plate 110 (FIG. 2) to the front cover 102 and then attaching the front cover to the body framework, generally indicated at 112.

The keyboard plate 110 (FIGS. 1, 2 and 3) has suitable holes 116 (FIG. 2) cut therein to receive the usual value entry and control keys 118 which project therethrough. The front cover 102 has downwardly extending lugs 120 projecting through holes in spring clips 122 which extend beneath the plate 110 and are forcibly engaged with the lugs to hold the cover and the plate together as a unit.

Figure 2:
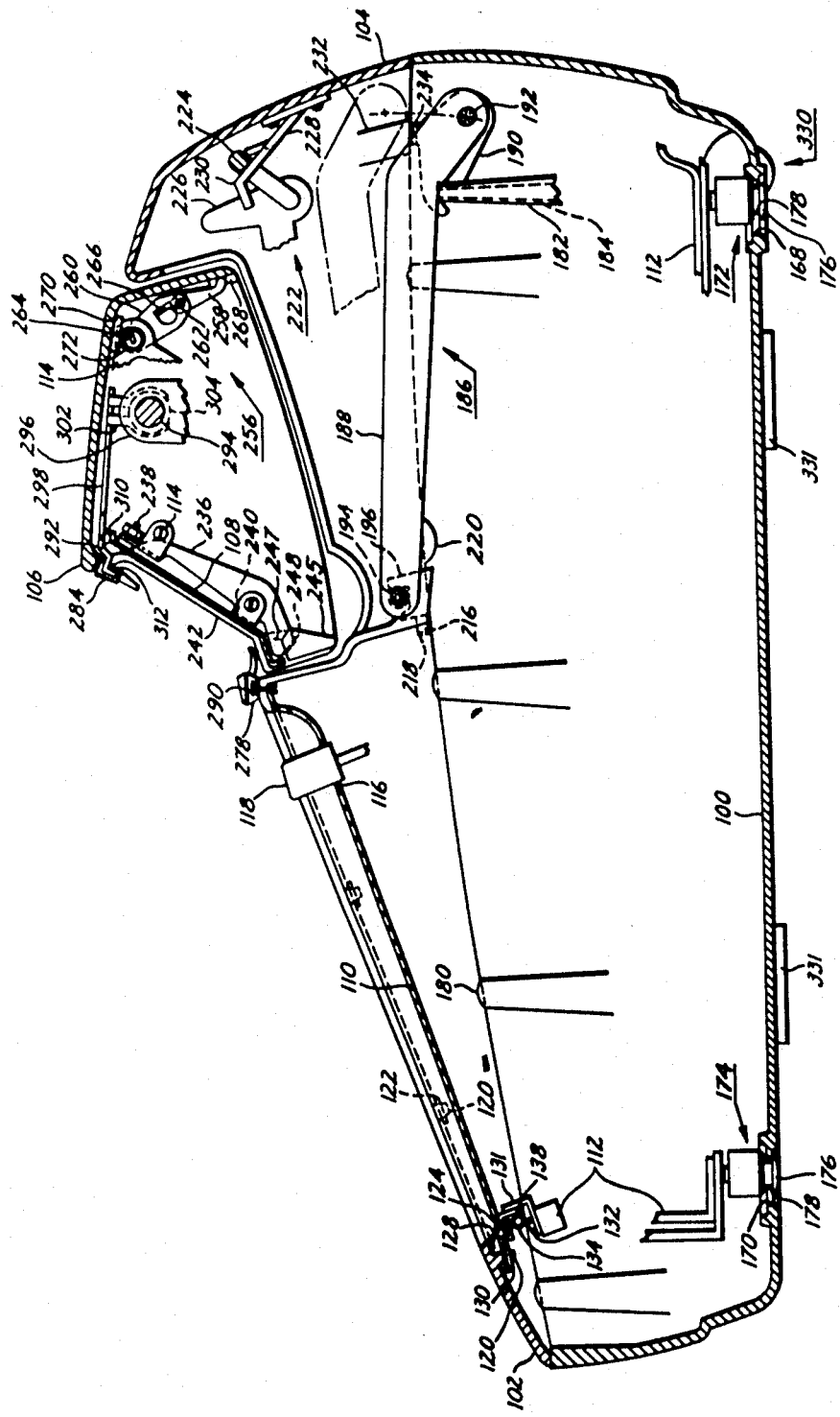
FIG. 2 is a right side view partially in section taken generally through the center of the machine showing the manner in which the various covers are held to each other and to the calculating machine framework.
Figure 3:
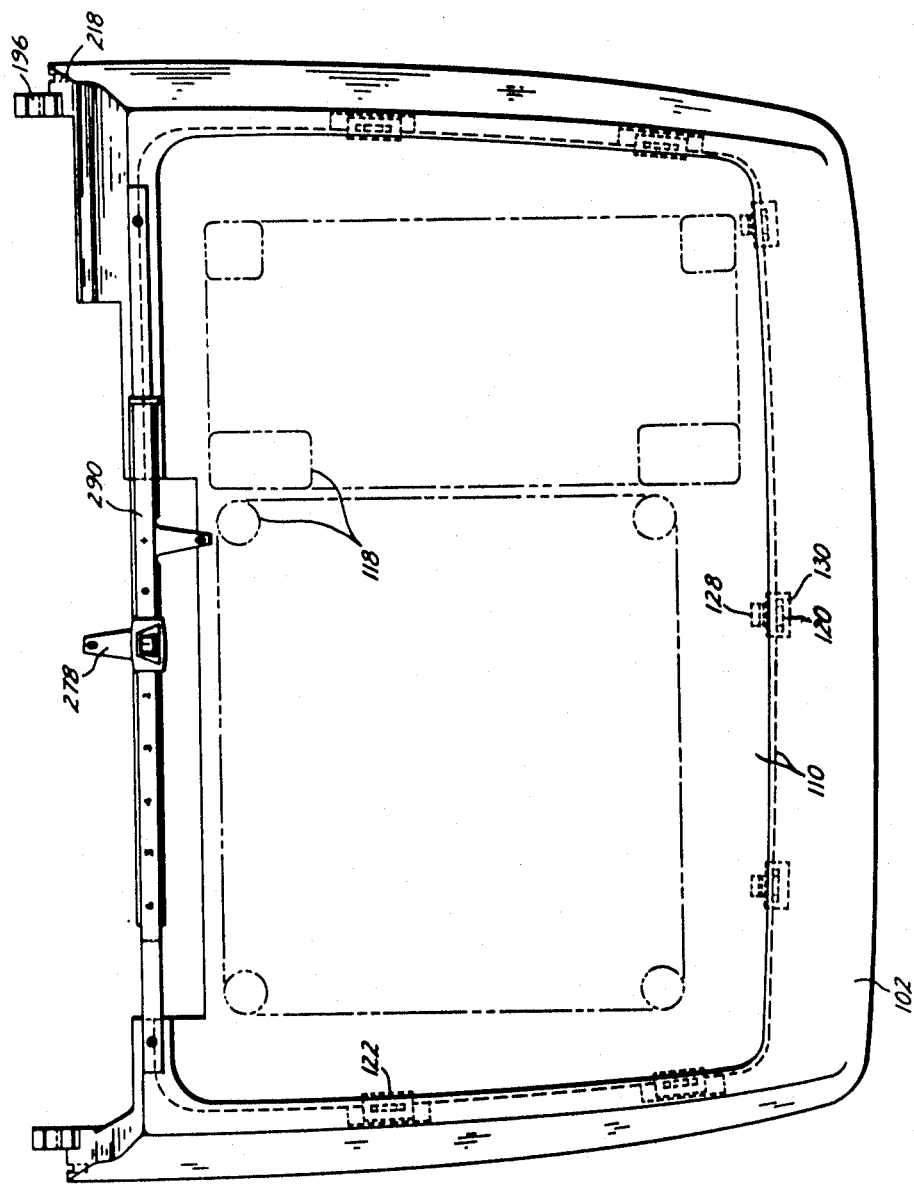
FIG. 3 is an enlarged top view of the calculating machine keyboard plate and front cover.
Figure 4:
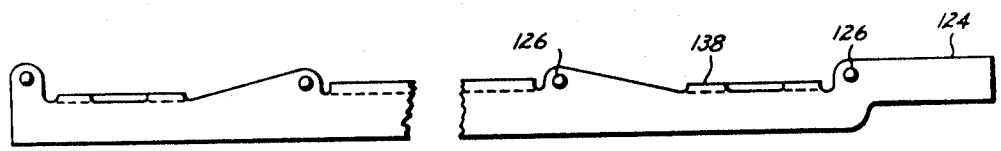
FIG. 4 is an enlarged top view of a keyboard plate bracket that is welded to the underside of the keyboard plate.
Figure 5:
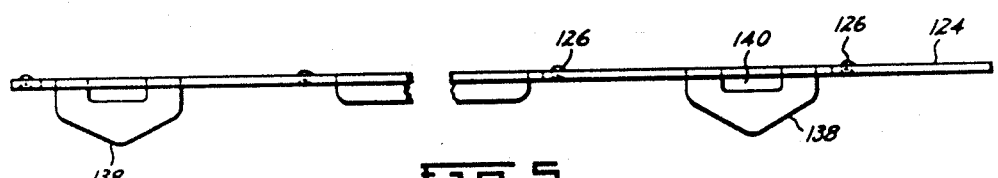
FIG. 5 is a front view of the keyboard plate bracket shown in FIG. 4.

A keyboard plate bracket 124 (FIGS. 2, 4 and 5) is formed with extrusions 126 in the shape shown, which extrusions are spot welded to the bottom front edge of the keyboard plate 110. The bracket 124 is not shown in FIG. 3 in order to better show angle clips 128 which fit over lugs 120 on the front cover and engage the forwardly extending edge of the bracket 124 (FIG. 2). A spring clip 130 fits over each lug to hold the angle clip 128, the bracket 124 and the keyboard plate 110 in the position shown. Three pairs of the clips 128 and 130 are fitted over downwardly extending lugs 120 across the front of the machine as indicated in FIG. 3.

Figure 6:
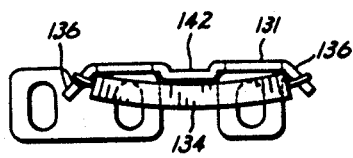
FIG. 6 is an enlarged top view of a frame bracket.
Figure 7:
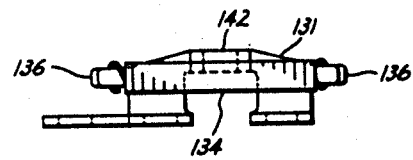
FIG. 7 is a front view of the frame bracket shown in FIG. 6.

Right and left frame brackets 131 (FIGS. 2, 6 and 7) are provided for engagement with the keyboard bracket 124 and are secured to the body framework 112 by hexagon headed screws 132 extending into threaded holes in the framework. A resilient holding means for bracket 124 is provided by a strong steel spring 134 wound of music wire and mounted between right and left tabs 136 (FIGS. 6 and 7) of each frame bracket 131. The right and left frame brackets 131 are mounted in a position on the frame 112 so that they are in substantial alignment with a pair of downward extending tabs 138 (FIGS. 2 and 5) on the keyboard plate bracket 124.

During the initial assembly of the covers, the screws 132 (FIG. 2) are not completely tightened so that the frame brackets 131 are loose with respect to the frame 112. The keyboard plate 110, clipped to the front cover 102, is placed over the keys of the keyboard. The tabs 138 (FIGS. 2 and 5) extending from the keyboard cover bracket 124 are inserted between the springs 134 and the frame brackets 131. A hole 140 (FIG. 5) in each of the tabs 138 is engaged in a locking position with an extruded portion 142 (FIGS. 6 and 7) of the frame brackets. In practice it has been found that the springs 134 hold the brackets 124 and 131 interlocked tight enough so that the entire machine may be raised by raising the front cover. With the frame brackets 131 loose with respect to the frame 112, the keyboard plate 110 and front cover 102 may be shifted around until the keyholes 116 (FIG. 2) in the plate are aligned with the keys 118. After such alignment, the screws 132 are tightened through the use of open end wrenches. The cover 102 and plate 110 now may be easily removed from interlocking engagement with the machine framework merely by pulling the cover forward or rotating the cover counterclockwise (FIG. 2) about bracket 131 to stretch the spring 134; and then by raising the cover, the extrusions 142 are disengaged from the holes 140. After the initial alignment no tools are required to remove or replace the keyboard plate and front cover.

A bracket arrangement 144 (FIG. 8) is disclosed as a second embodiment for holding the front cover 102 and keyboard plate 110 to the machine framework 112. The arrangement 144 comprises a keyboard plate bracket 146, similar to the bracket 124 (FIGS. 2, 4 and 5), formed with extrusions 148. As with the bracket 124, the extrusions are spot welded to the bottom front edge of the keyboard plate 110. The bracket 146 and keyboard plate 110 (FIG. 2) are held to the front cover 102 by lugs 120, angle clips 128 and spring clips 130 in the same manner that the front cover 102, keyboard plate 110 and bracket 124 are held together.

Figure 8:
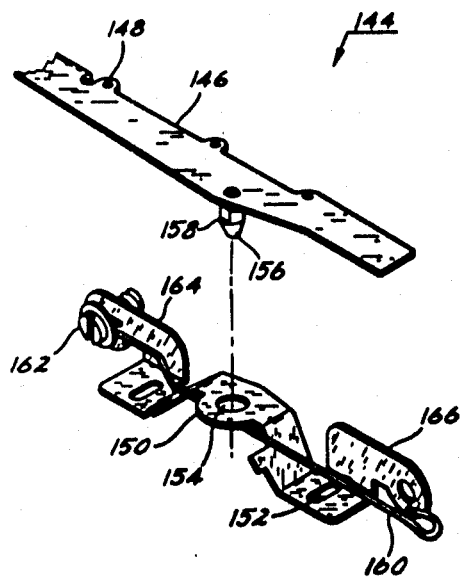
FIG. 8 is an isometric view of an alternate embodiment of a keyboard plate bracket and frame bracket.

Right and left frame brackets 150 (FIG. 8) are provided for mounting in place of the brackets 131 on the main framework 112 and are held by screws 132 (FIG. 2) passing through holes 152 (FIG. 8). The bracket 150 is formed with a hole 154 closely fitted for receiving a lock stud 156 which may be spot welded, riveted or otherwise suitably fastened to the bracket 146 in substantial alignment with the hole 154. The lower end of the stud 156 is tapered and has a groove 158 formed in the center portion.

During the initial assembly, as with the brackets 131 (FIG. 2), the screws 132 are not completely tightened.

The assembled front cover 102, keyboard plate 110 and bracket 146 are placed so that the keyholes 116 are over the keys 118 and the studs 156 are over the holes 154. The whole assembly is then lowered and the studs 156 inserted into the holes 154. As the assembly is lowered, the tapered end of the stud 156 engages a lock spring 160 which cuts across a portion of the hole 154. The spring 160 is fastened by a screw 162 at one end of the bracket 150 and is tensioned towards the hole 154. As the stud 156 is lowered, the spring 160 is cammed away from the hole 154, permitting the insertion to continue. When the assembly is lowered to the point that the lower surface of the bracket 146 contacts upper edges 164 and 166 of the bracket 150, the spring 160 snaps into the groove 158, locking the stud and assembly to the main framework 112. As in the first embodiment, the assembly may be shifted around to align the keyholes 116 with the keys 118 before the screws 132 are tightened. The plate 110 and cover 102 now may be easily removed from the framework 112 by manually pulling the springs 160 on right and left brackets 150 forward, away from the holes 154, thereby releasing the studs 156 so that the entire assembly may be lifted from the framework 112. After the initial alignment, the assembly may be replaced simply by lowering the studs 156 into the holes 154 and thereafter the assembly may be removed by pulling the springs 160 away from the studs 156 and raising the assembly.

Bottom cover

Figure 9:
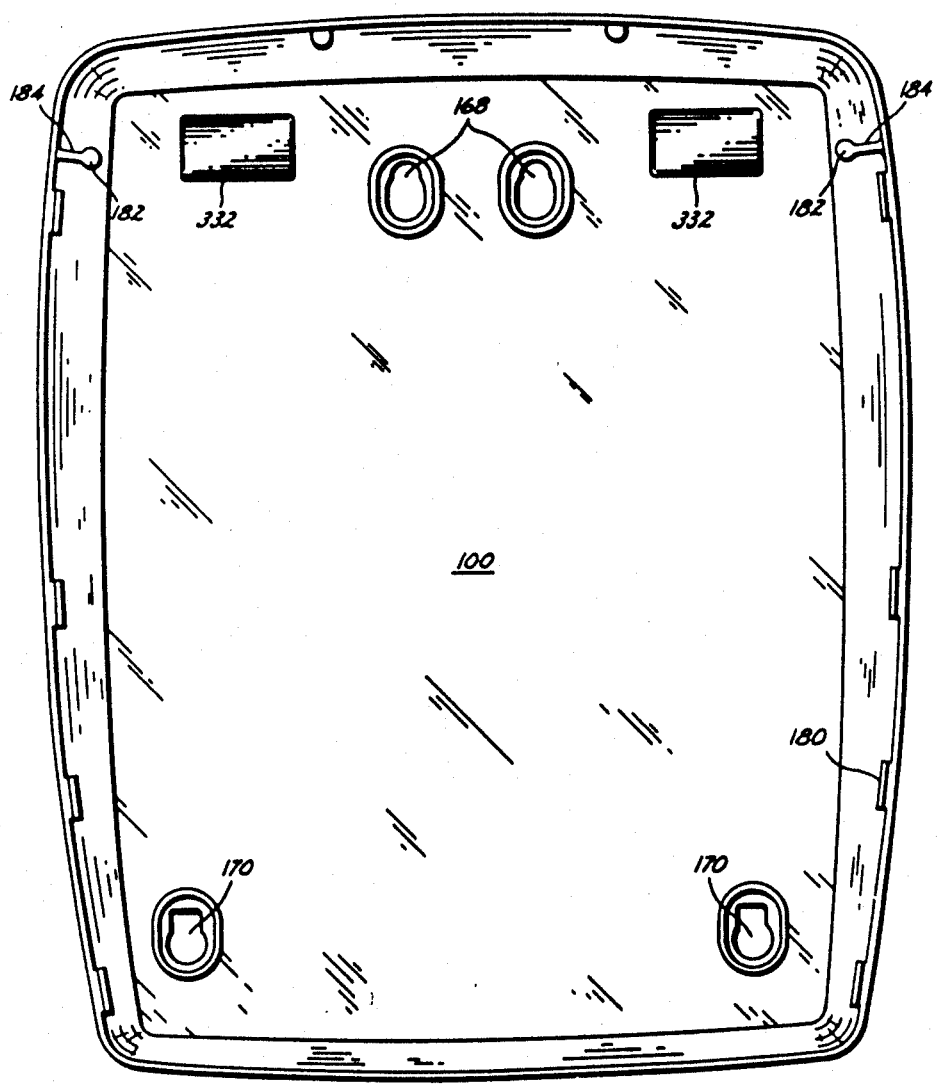
FIG. 9 is a top view of the bottom cover with the other covers and the machine framework removed.

The bottom cover 100 (FIGS. 1, 2 and 9) is formed, as shown in FIG. 9, with rearward keyholes 168 and forward keyholes 170 to receive a set of cushion mounts secured to the machine framework 112. The mounts comprise a pair of resilient rearward feet 172 and a pair of resilient forward feet 174 each having a bottom flange 176 and a peripheral groove 178. The front portion of each keyhole is sufficiently wide to receive the bottom flange 176 while the rear portion of each keyhole is reduced to retain the flange. The rear portion of each of the rearward keyholes 168 is substantially the same diameter as the grooves 178 while the rear portion of each of the forward keyholes 170 is wider than the grooves 215. This permits sideways adjustment of the forward feet 174 in the wide portion of the keyholes 170.

To secure the bottom cover 100 to the machine framework 112, the machine is placed into the cover 100 with the feet 172 and 174 in the larger portions of respective keyholes. The framework is then moved rearward relative to the bottom cover so that grooves 178 in the feet are engaged with the rearward edges of respective keyholes. During placement of the machine and framework into the cover 100, upwardly extending tabs 180 (FIGS. 2 and 9) on the bottom cover engage the inner surface of the downwardly depending portion of the front cover 102 to provide means for aligning the sides of the front and bottom covers. Since the forward feet 174 are free to move sideways, the forward machine framework 112 and the front cover 102 are able to move sideways to permit the upwardly extending tabs 180 to automatically align the front cover with the bottom cover 100. The sides of the bottom cover are somewhat springy and may be made wide enough so that there is always a slight force outward against the sides of the front cover when the covers are aligned.

Still further alignment is achieved between the front and bottom covers by the following. With the front cover 102 and the keyboard plate 110 attached to the framework 112, rearward movement of the machine within the bottom cover tends to raise the front part of the framework 112 a slight amount due to the camming action of the upward sloping mating edges of the sides of front and bottom covers. This action forces the two covers tightly against each other due to the restraint offered by the machine framework 112 through the brackets 131 (FIG. 2) or 150 (FIG. 8). The resilient feet 172 and 174 (FIG. 2) act as tension members between the two covers.

Thus, with the above described covers and framework in the position shown in FIGS. 1 and 2 a snug, precise, self-aligning fit is obtained between the bottom and front covers.

Main toggles

The bottom cover 100 (FIGS. 1, 2 and 9) is die cast in a process using an inner core and shell. After removal of the shell from the molded cover, the cover tends to stick to the inner core. In order to remove the cover from the core, knockout posts 182 (FIGS. 2 and 9) are molded as part of the cover and connected to the sides of the cover by webs 184 formed in the cover. After removal of the shell, pressure is applied to the posts to drive the cover from the inner core. Since the web and posts are necessary in the molding process, they have been conveniently located to serve as anchor points for stress means which create forces for holding the covers together and to the framework. The term "stress means" as used herein refers to a device which creates stressing forces tending to strain a large area of the covers rather than a device such as a screw, used in the ordinary way, which ordinarily causes only localized stress and strain.

The stress means comprises right and left toggle mechanisms 186 (FIGS. 2 and 10) having links or arms 188 and 190 pivoted together with a shoulder rivet 192. The arm 190 overlies and abuts the rearward side of the web 184. The forward end of the toggle arm 188 carries a stud 194 which is anchored in a socket formed in a projection 196 (FIGS. 2, 3 and 10), which projection is off-set interiorly and extends rearwardly from the front cover 102. The stud 194 comprises a portion of an adjustable fastener 198 (FIG. 11) which is fixed to the toggle arm 188 by means of a pin 200 eccentric to the stud 194. The pin extends through a hole in the forward end of the toggle arm 188 with the end headed over a dish shaped spring washer 201 to adjustably hold the stud 194 to the arm 188. Such adjustable fastener is fully shown and described in U.S. Patent No. 2,973,981, issued March 7, 1961, to H. F. Noller. During the initial assembly of the covers, the stud 194 is turned with a screw driver to an adjustment where the forward edge of the front cover is aligned with the bottom cover and the toggle arms can be easily pushed with the fingers from a dotted outline position shown in FIG. 2 to the solid line position and yet still be tight enough to hold the covers together and to the framework.

Movement of the right and left main toggles 186 (FIGS. 2 and 10) from the dotted outline position to the solid position creates forces in the toggle arms which pull the keyboard plate bracket 124 rearward, firmly into engagement with the frame brackets 131. Because of the downward angle between the projection 196 and the web 184, the toggle arms also exert a slight downward force on the front cover along the line of engagement between the bottom edge of the front cover and the top edge of the bottom cover. Forcing the front cover rearward and downward in this manner brings the front cover precisely and firmly into engagement with the bottom cover. The rearward force exerted by the toggle arms on the frame brackets 131 is transmitted through the body framework 112 to the four resilient feet 172 and 174 (FIGS. 2 and 12). The feet are forced rearwardly against the rearward edge of respective keyholes 168 and 170 (FIGS. 2 and 9) and are strained or tipped to the rear slightly to provide some of the resilient stress forces opposed to the forces exerted by the main toggles 186, other resilient stress forces being set up in the covers. The resiliency in the feet permits the front and bottom covers, the framework and the main toggles to be pulled together snugly, yet resiliently held to take up any tolerances, variations or other irregularities in the size of the parts. The feet as described below, also provide a means for isolating vibrations and sounds of the machine and framework from the covers.

Resilient feet

The construction of the resilient feet 172 and 174 (FIG. 2) is shown in FIG. 12. Each of the feet 172 and 174 comprise a bushing 202 having a flange 208 with resilient spacers such as rubber washers 206 mounted on each side of the flange. The bushings and spacers are assembled in a machine mount cup 210 and a steel retaining washer 212 is placed next to the upper spacer. Then the spacers 206 are compressed in the cup and the steel washer 212, which is next to the upper spacer, is staked at 214 by the edge of the cup to hold the rubber spacers compressed. After assembly of a foot it may be secured to the framework 112 by means of a screw 204 which extends through the bushing 202 into the framework. A central hole 213 is provided in the steel washer to permit the bushing 202 to extend therethrough for mounting on the framework. The hole 213 is larger than the bushing and of such a diameter as to be maintained clear of the bushing in normal use. Such a foot construction provides a mount which permits resiliency in all directions between the cover 100 and the framework 112.

Referring to the view of the bottom cover 100 (FIG. 9), the two rear feet 172 are closely spaced and may be considered for present purposes as a single point of support, while the two forward feet 174 are spaced further apart. This arrangement provides, in effect, an inherently stable three point support of the machine in the bottom cover, with all four supporting feet lying substantially in the same horizontal plane regardless of any irregularities in the contours of the covers tending to pull the feet and twist the framework 112 (FIG. 2) in the horizontal plane. The arrangement also eliminates any possible tipping and resultant twisting of the framework 112 (FIG. 2) due to uneven contact of the feet with the bottom cover as the feet are pulled into engagement with the bottom cover.

A single foot could replace the feet 172; however, the single foot would need to be heavier to carry the same load as carried by the feet 172, and it is simpler to manufacture a single type of foot than two types.

Back cover

Figure 10:
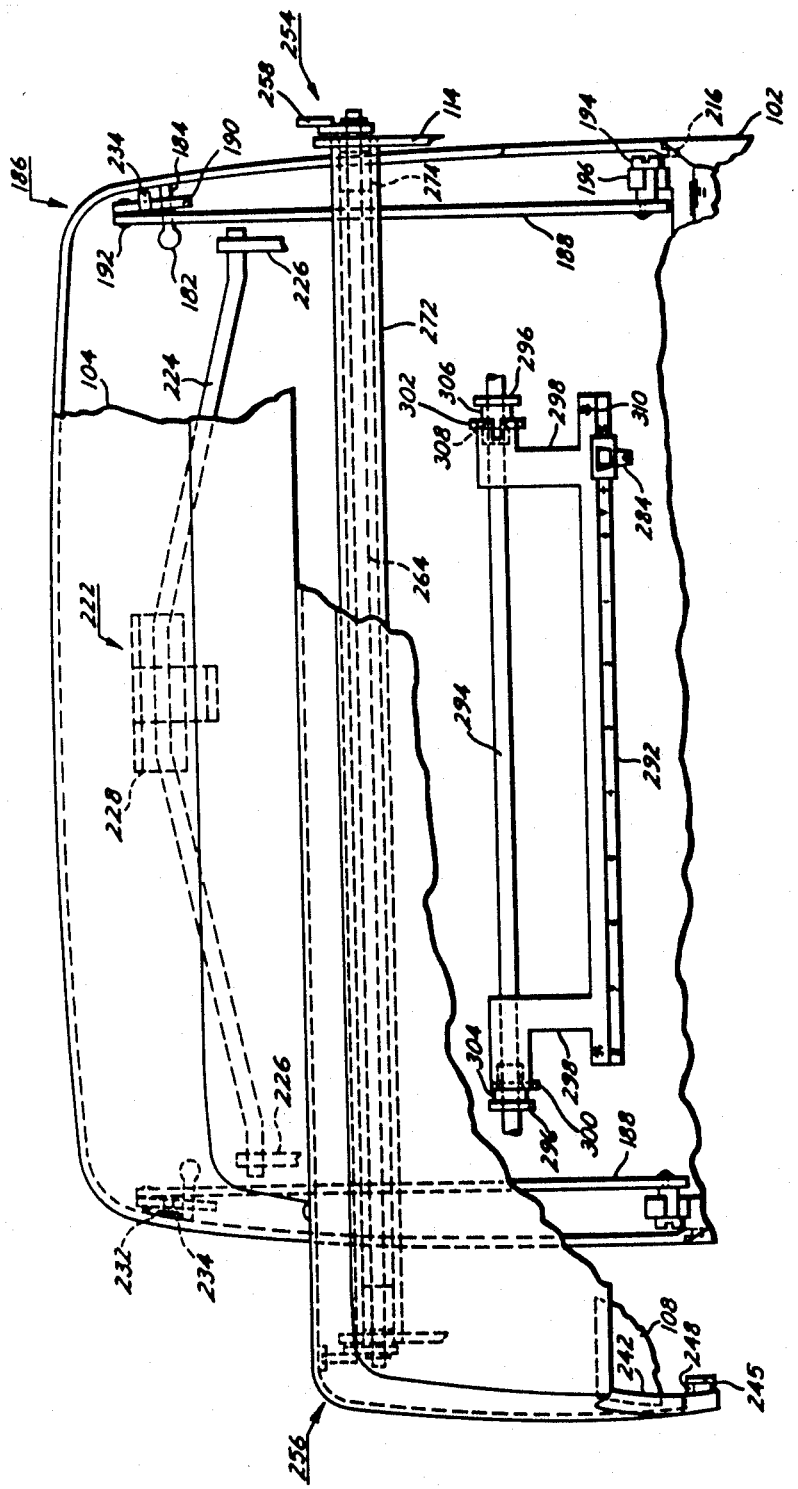
FIG. 10 is a top view of the rear portion of the cover assembly with the carriage cover and the back cover partially broken away to illustrate toggle mechanisms for holding the covers together and to the framework. This figure also illustrates the manner of mounting a decimal point indicator frame on the machine framework.
Figure 17:
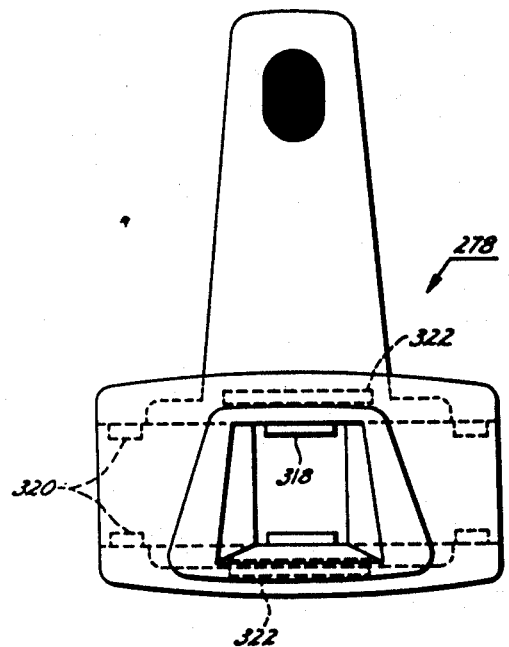
FIG. 17 is an enlarged top view of a second decimal point indicator.
Figure 18:
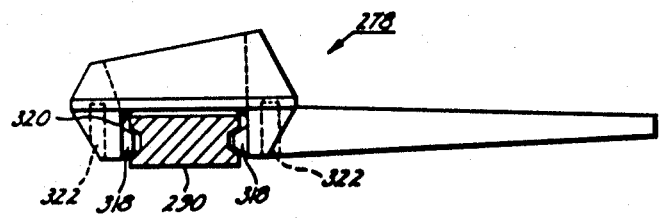
FIG. 18 is an enlarged side view of the decimal point indicator of FIG. 17.

Referring to FIGS. 1, 2 and 10, the back cover 104 is fitted against the bottom and front covers. Forwardly extending tenons 216 (FIGS. 2 and 10) on the right and left sides of the back cover fit into sockets 218 (FIGS. 2 and 3) in the rearward part of the front cover to hold the forward part of the rear cover down and in engagement with the bottom cover, and also to prevent inward and outward flexing of the front and back covers.

Downwardly extending tabs 220 (FIG. 2) on the inside forward part of the right and left sides of the back cover 104 fit snug against the inside of the bottom cover. Since the back cover is somewhat flexible the sides of this cover can be bent outwardly by hand if it is necessary to obtain a snug fit during the assembly of the covers.

Stress means in the form of a back cover latch mechanism 222 are provided to hold the rearward portion of the back cover 104 in engagement with the bottom cover 100 and to force the forward part against the front cover 102. The latch mechanism comprises a formed rod 224 which extends transverse to the machine, with right and left ends mounted in main framework members 226. A resilient spring metal bracket 228 is suitably fastened to the back cover 104. Clockwise rotation of the rod 224 to the position shown in FIG. 2, detents the rod over a high point 230 of the spring bracket, thereby forcing the back cover into engagement with the front and bottom covers and also holding the back cover to the framework. With the carriage cover 106 removed and the carriage shifted to the extreme left end position, the rod 224 may be operated easily with the fingers to engage or disengage the bracket and yet, when in engagement with the bracket, the back cover is tightly and resiliently held to the framework and against the other covers.

The back cover 104 also functions as a lock for the toggles 186 (FIGS. 2 and 10) to maintain the toggles in the position shown in FIG. 2. With the back cover 104 is held to the bottom cover 100 in the manner discussed, right and left shoulders 232 formed in the back cover overlie ears 234 extending from right and left toggle arms 190. The shoulders and ears prevent the toggles from being released as a result of vibration or movement of the machine.

Still another function of the back cover is to interlock with the front and bottom covers. Referring to FIG. 2 an interlocking arrangement of the covers is obtained due to the downwardly projecting tabs 220 on the back cover 104, the upwardly projecting tabs 180 on the bottom cover 100 and the tenons 216 on the back cover. The upwardly projecting tabs 180 restrain the bottom cover from flexing outwardly and the front cover and back cover from flexing inwardly. The downwardly projecting tabs 220 on the back cover and the tenons 216, in engagement with the front cover sockets 218, resist inward flexing of the sides of the bottom cover. Outward flexing of either the back or the front cover is resisted by the tenons 216 and the downwardly extending tabs 220.

Such interlocking provides a smooth, tightly fitting structurally strong and flexible cover arrangement.

Faceplate

The faceplate 108 (FIGS. 1 and 2) is attached to right and left carriage framework brackets 236 before the carriage cover 106 is put on the carriage. Threaded studs 238 are spot welded to the underside of the faceplate 108 and extend through holes in the carriage frame brackets 236 and are locked by nuts to the brackets. The holes in the brackets are larger than the threads so that the faceplate may be adjusted to align the dial windows with numeral wheel dials before the faceplate is tightened down. The faceplate is held along right and left edges against a web 240 of the bracket 236 by an overlying flange 242 (FIGS. 1 and 10) on the carriage cover 106.

Carriage cover

The carriage cover 106 (FIGS. 1 and 2) extends across the top and back of the carriage and has forwardly extending portions which cover the ends of the carriage. The bottom of the cover is open as is usual in calculating machines. The cover is mounted on the carriage by holding it above and in a forwardly tilted position and then sliding a receiver 245 (FIGS. 2 and 10) molded on each end portion of the cover, into engagement with respective end portions 247 of the right and left carriage frame brackets 236. Each receiver 245 has a socket 248 which receives the lower end 247 of each of the two carriage frame brackets 236. Then the cover is swung clockwise to the position shown where a toggle mechanism is provided to lock down the back portion of the cover. During assembly, the lower end of each bracket may be bent slightly outwardly or inwardly to fit into the socket 248 and thus align the carriage cover with the faceplate. Also, there is sufficient flexibility in the right and left sides of the carriage cover to permit the cover to be aligned perfectly with the faceplate with very little adjustment during the original assembly and with no adjustment during any subsequent removal and replacement of the carriage cover 106.

The flange 242, in the area indicated at 250 (FIG. 1) extends inwardly as shown in FIG. 10 and slightly overlies an extended portion of the faceplate 108; however the flange 242 does not extend into the area indicated at 252, the cover in that area being solid. In the area 252, the faceplate 108 is shorter, overlies the top of receiver 245 and abuts the side of the cover. In this manner, the bottom of the faceplate is held in place by the web 240 and flange 242, while the top of the faceplate is fixed to the framework at 238 (FIG. 2).

The rearward portion of the carriage cover is held rearwardly and downwardly by a stress means comprising right and left manually operated carriage toggle mechanisms 254 and 256 respectively (FIGS. 2 and 10). The toggle mechanism 256 is best shown in FIG. 2 and comprises a pair of toggle links 258 and 260, pivotably connected together at 262. Link 260 is loosely keyed to a shaft 264 (FIGS. 2 and 10) for a purpose presently made clear. A tab 266 is provided for limiting movement of the toggle to the position shown in which the lower end of the toggle mechanism is in engagement with a notch 268 formed in the cover. With both toggles snapped to the position shown in FIG. 2, the rear of the cover is forced downward, thus bringing a rubber pad 270, cemented to the inside of the carriage cover, into resilient engagement with a hollow torsion bar 272 (FIGS. 2 and 10), which is fixed in the carriage framework 114 and which is shown enlarged in FIG. 10. Forcing of the toggles 254 and 256 to the position shown in FIG. 2 also moves the carriage cover rearward to cam the respective sockets 248 downward along the sloping front ends of the carriage frame brackets 236, lowering the rightward edge of the sockets slightly away from the brackets 236. This movement terminates when flanges 242 on each end of the cover clamp the faceplate 108 firmly against the webs 240 of brackets 236. The cover and the lower ends of the faceplate are thereby tightly held to the carriage framework by the toggle mechanism.

The upper arms 260 of the toggle mechanisms 254 and 256 are loosely keyed to the shaft 264 (FIGS. 2 and 10), which shaft is mounted inside of the torsion bar 272, so that the arms 260 can be moved together under certain conditions and moved separately under other conditions. Rubber bushings 274 (FIG. 10) are mounted on the shaft 264 inside of the torsion bar to resiliently hold the shaft concentric to the hollow bar. With such an arrangement, both of the toggles may be released from the position shown in FIG. 2 by rocking only one of the toggle mechanisms. Consequently, if the carriage jams in a shifted position which renders one of the toggle mechanisms inaccessible, then, since the other end of the carriage is overhanging the side of the machine, a serviceman may reach the other one of the toggle mechanisms and thereby release both of them to remove the carriage cover 106. By permitting a limited amount of independent movement, however, the loose keying arrangement facilitates independent positioning of the toggle arms 258 into their respective carriage cover notches 268 during assembly.

Decimal point indicators

The decimal point indicators 276 and 278 (FIG. 1) are provided for a product register 280 and two indicators 282 and 284 are provided for a quotient register 286.

During the accumulation of products or quotients in registers 280 and 286, the operator frequently finds it convenient to use a selected one of the ordinally arranged decimal point indicators 276 and 282, which are painted on the faceplate. These indicators may be exposed by sliding decimal covers 288, in a manner described hereinafter.

In other types of problems, the operator may find it more convenient to use the indicators 278 and 284 which are slidably mounted on supporting bars 290 and 292, respectively, both of which bars are fixed to the main framework of the machine.

The provision of dual indicators is known; however, prior ordinal indicators have been expensive to manufacture, difficult to use, and have tended to scratch the index numbers off of the bars upon which the indicators slide.

Figure 19:
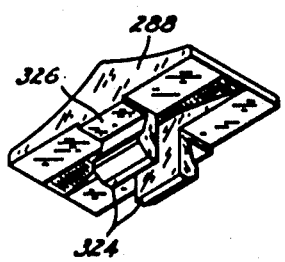
FIG. 19 is an isometric view of a slidable decimal point cover.

Referring first to the bar 292 for the slidable indicator 284 (FIG. 1), although the supporting bar 292 is maintained stationary, it is mounted on a shaft 294 (FIGS. 2 and 10) which moves with the carriage. The shaft 294 is supported in the position shown by an extension 296 from the main framework 112. Shaft 294 is conventional and similar to a shaft 260 disclosed in FIG. 19 of U.S. Patent No. 2,271,240 issued January 27, 1942 to H. T. Avery, and is primarily provided to support the carriage for shifting movement relative to the main body of the machine. The bar 292 projects between the faceplate 108 and the carriage cover 106 and has a pair of extensions 298. Bifurcated ears 300 and 302 (FIGS. 2, 13 and 14) depend from respective extensions 298 and embrace respective bushings 304 and 306 (FIG. 10) which are suitably fixed to the frame 296 and through which the shaft 294 slides. Ear 300 is engaged with the bushing 304 by first passing the slot in ear 300 over the shaft 294 and then moving the ear axially of the shaft and over the smaller of two outside diameters of the bushing 304. Ear 302 fits in a groove 308 (FIG. 10) formed in the bushing 306 and is split to provide radial resilience so that the member may be snapped into and out of the groove. The bushings prevent the frame 292 from being radially pulled from the bushings or being moved rightward or leftward.

Downwardly extending nylon pads 310 (FIGS. 2 and 10) are inserted through holes on the right and left ends of the bar 292 to provide a sliding surface for the bar on the faceplate 108 as the carriage and faceplate are shifted to the left or right.

The decimal point indicator 284 (FIGS. 1, 2 and 10) which is mounted on bar 292, is shown in detail in FIGS. 15 and 16. The indicator 284 may be molded of a resilient material such as polypropylene plastic. A tapered tongue 312 fits under the forward edge of the bar 292 as shown in FIG. 2, and a portion of the bar 292 is formed to fit between the tongue 312 and the rear wall of the indicator 294. This arrangement permits lateral sliding movement of the indicator 284, yet resiliently holds the indicator 284 on the bar. Four angled bearing pads 314 (FIGS. 15 and 16) are provided in each of the four upper corners of the indicator 284 to bear on the upper surface of the bar 292. The bearing pads permit the indicator to be moved rightward or leftward over the bar without the indicator coming into contact with and defacing the painted symbols (FIG. 10) on the bar.

It will be observed that the tongue 312 (FIG. 15) is well within a window 316, and since there are no overlapping surfaces as viewed from the top, the indicator may be conveniently molded in a two piece mold.

The product register decimal point indicator 278 (FIGS. 1, 2, 17 and 18) is molded of a plastic such as polypropylene to fit over a decimal point indicator slide bar 290 which is suitably fixed to the front cover. The indicator may be molded of any material which, when formed into thin sections, is flexible. The indicator 278 is provided with projections 318 to fit into grooves on the slide bar 290 to hold the indicator in engagement with the bar. Four angled bearing pads 320 are provided to space the indicator 278 from the top of bar 290, thus preventing defacement of symbols painted on the bar. Forward and rearward cavities or wells 322 are molded in the indicator to lend flexibility to the projections 318. Such wells enable a good fit between the indicator and the bar without trimming or shaping flashings, and despite other irregularities or variations in the parts, thus permitting the indicator to easily slide over the bar.

Decimal point covers

Referring now to the decimal point indicators 276 and 282 (FIG. 1) painted on the faceplate 108, the following means are provided not only to normally cover each indicator individually, but to permit selective exposure of any one or more painted decimal indicators.

Figure 20:
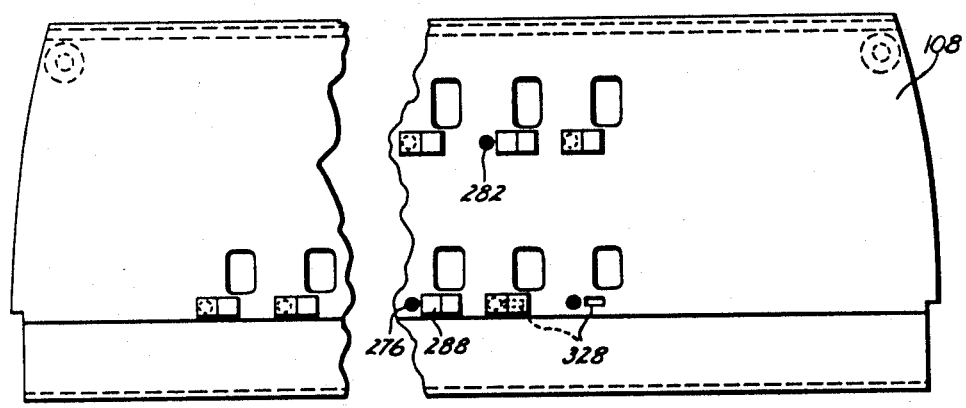
FIG. 20 is an enlarged front view of a portion of the carriage faceplate of FIG. 1 showing the relationship between decimal points painted on the faceplate and respective decimal point covers inserted into slots in the cover.

The decimal point covers 288 (FIGS. 1, 19 and 20) are molded of a resilient material such as polypropylene plastic in the form shown and are easily assembled into the face plate 108 to cover and uncover decimal points 276 and 282 painted on the faceplate 108 between each pair of adjacent dial windows. Two downwardly projecting tabs 324 are molded on the cover 288 with a space therebetween to provide flexibility of the tabs inwardly and outwardly. A small projecting surface 326 is provided on either side of the tabs 324 for sliding engagement with the faceplate 108 and for holding the main portion of the indicator away from the faceplate and the underlying decimal point, thereby preventing defacement of the associated decimal point. A lateral slot 328 (FIG. 20 is formed in the faceplate 108 to the right of each decimal point cover. During assembly of a decimal point cover, the angled portions of the tabs 324 are engaged with the lateral sides of the slot 328 and then pushed through the slot. The space between the tabs allows the tabs to be forced inward and then to spring outward to lock the cover in the slot. Because the tabs are flexible, variations and irregularities in the size of tabs and slots can be tolerated, yet a snug but moveable fit is still maintained. The length of the slots 328 in the faceplate 108 is great enough that the covers 288 may be moved endwise to cover or uncover selected decimal point indicators 276 and 282. Such an arrangement of the decimal point covers permits lateral sliding and enables an operator to cover the indicators in one stroke.

Roller assembly

Two roller assemblies 330 (FIGS. 2 and 21) are provided underneath the bottom cover 100 to permit ease of movement of the calculating machine over a supporting surface, a desk top for example. The rollers are located rearwardly of the rear feet 172 of the machine and normally do not contact the desk top; however, when the front of the machine is raised from rubber pads 331 on which the machine normally rests, the rollers are brought into contact with the desk. Each roller assembly 330 is inserted within a cavity 332 (FIGS. 9 and 21) in the bottom cover 100.

Figure 21:
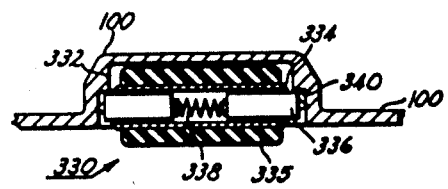
FIG. 21 is a sectional view of a roller assembly inserted in a cavity in the bottom cover.

Referring to FIG. 21, each roller assembly 330 comprises a bushing 334 mounted within a roller 335 made of rubber or the like. The bushing forms a bearing surface for split halves 336 of an axle, each half having a pointed outer end and a stud projection in the form of a knob on the inner end. A compression spring 338 is mounted over the knobs, holding the halves together as a unit to facilitate assembly. To insert the assembly into the cavity, one of the axle halves is inserted into the cavity until it engages a shoulder 340. The other half is then forced into the roller hole against the outward urging of the spring 338 and the whole assembly pushed into the cavity until the second half is located against the opposite shoulder 340. Release of the second axle half permits the spring 338 to force the points on both the axles outwardly to penetrate the aluminum casting. With the points embedded in the aluminum, the rollers 335 are firmly in place and cannot be easily removed without compressing the axle halves against the spring with a tool. During routine use there is limited rotation of the axles with the roller so that the points become even more firmly embedded in the casting after the initial assembly. This arrangement eliminates any requirement that the sidewalls of the cavities 332 slope slightly inwardly to hold the rollers in the cavity. Such an inwardly sloping cavity, because of the smaller outer opening to the cavity, requires a complicated mold or a machining operation. With vertical sidewalls, the rollers are adequately held and only a very simple mold is required to form the cavity.

The slidable decimal point indicators and respective mounts, and the roller assembly in the bottom cover form the subject matter of a divisional patent application Serial No. 357,622, filed April 6, 1964, in the names of Charles A. Lindberg and Harry F. Noller as joint inventors.

The invention claimed is:
1. In a cover assembly, the combination of:
 (a) a first cover,
 (b) a second cover,
 (c) means interconnecting a first portion of said first cover to a first portion of said second cover,
 (d) a first toggle link, one end of which is connected to a second portion of said first cover,
 (e) a second toggle link, one end of which is connected to a second portion of said second cover, and
 (f) means connecting the opposite respective ends of of said first toggle link to said second toggle link whereby operation of the toggle links transmits a force to hold the covers together.
2. In an office machine cover assembly, the combination of:
 (a) an internal framework,
 (b) a bottom cover,
 (c) resilient means between said framework and said bottom cover,
 (d) a second cover,
 (e) interlocking brackets mounted on said framework and said second cover, and
 (f) stress means between said bottom cover and said second cover for transmitting a force to said framework through said interlocking brackets to strain said resilient means between said bottom cover and said framework and set up resilient opposing forces to said stress means to hold said covers to each other and to the framework, the resilient means taking up any variation in tolerance of the covers and framework.
3. In an office machine cover assembly, the combination of:
 (a) an internal framework,
 (b) a first cover,
 (c) a second cover interconnected with said first cover,
 (d) a first member carried by said framework,
 (e) a second member carried by said second cover,
 (f) compressible spacers between said first and second members,
 (g) means for compressing said spacers between said members and holding them compressed to maintain a resilient connection between the members,
 (h) a first arm anchored to said first cover,
 (i) a second arm anchored to said second cover, and
 (j) means connecting said arms to enable rotation of the arms to a position in which a force is developed and applied through the arms, framework and covers to said members to set up resilient opposing forces in said spacers and to hold the covers to each other and to the framework, the spacers taking up any variation in tolerances of the arms, covers, and framework.
4. In an office machine cover assembly, the combination of:
 (a) an internal framework,
 (b) a first cover engaged with said framework,
 (c) mounting means extending from said internal framework,
 (d) a second cover in engagement with said mounting means and adjustable relative thereto,
 (e) means for aligning said second cover with said first cover during said adjustment, and
 (f) toggle means between said first and second covers for forcing and holding said covers and framework together in said aligned position.
5. In an office machine cover assembly, the combination of:
 (a) an internal framework,
 (b) a framework bracket,
 (c) a screw loosely holding said bracket to said framework,
 (d) a cover,
 (e) a cover bracket fastened to said cover, and
 (f) a spring carried by said framework bracket for holding said cover bracket in interlocking engagement with said framework bracket to permit alignment of the cover with the framework and tightening of the screw, the cover bracket thereafter being manually removable and replaceable in interlocking engagement with the framework bracket to bring the cover in alignment with the framework.
6. In an office machine cover assembly, the combination of:
 (a) an internal framework,
 (b) a cover,
 (c) engaging means integral with said cover,
 (d) second means loosely held to the framework and in engagement with said engaging means, thereby loosely holding said engaging means to said framework to permit movement of the cover, and
 (e) means firmly holding said engaging means and cover to said second means to permit alignment of the cover with the framework and tightening of the second means to the framework, the cover thereafter being manually removable and replaceable in engagement with the second means in alignment with the framework.
7. In a cover assembly, the combination of:
 (a) a bottom cover,
 (b) a front cover,
 (c) an internal framework,
 (d) toggle means between said bottom cover, said front cover and said framework,
 (e) a back cover including locking means formed thereon, and
 (f) latching means between said framework and said back cover for holding said back cover to said framework and against said front and bottom covers, and for holding said locking means over said toggle means to lock said toggle means against unlocking movement.

8. In a cover assembly, the combination of:
(a) a bottom cover,
(b) a front cover,
(c) an internal framework,
(d) a toggle linkage between said front and bottom covers for holding said bottom and front covers to said framework, and
(e) latching means between said framework and said back cover for holding said back cover to said framework and against said front and bottom covers.

9. In an interlocking cover assembly, the combination of:
(a) a back cover having projections extending downwardly and tenons extending forwardly,
(b) a bottom cover engaged with said projections to prevent inward flexing of said bottom cover and outward flexing of said back cover,
(c) a front cover having sockets in engagement with said tenons, and
(d) projections extending upwardly from said bottom cover into engagement with said back and front covers to prevent outward flexing of said bottom cover and inward flexing of said front and back covers, all said projections and tenons interlocking said covers to prevent inward and outward flexing of said covers.

10. In an interlocking cover assembly, the combination of:
(a) a first cover having a projection and a tenon,
(b) a second cover engaged with said tenon to prevent flexing of said covers,
(c) a third cover, and
(d) projections on said third cover in engagement with said first and second covers, all said projections and tenons interlocking said covers to prevent inward and outward flexing of said covers.

11. In a calculating machine comprising a carriage, the combination of:
(a) a carriage framework,
(b) brackets mounted on said carriage framework,
(c) a carriage cover formed with notches and sockets,
(d) right and left toggles mounted on said carriage framework and engageable with said notches to move said cover and bring said sockets into engagement with said brackets, said cover being firmly held to said framework by said toggles, and
(e) means interconnecting said right and left toggles to disengage both of said toggles when either one of said toggles is disengaged to release the cover from the framework.

12. In a self aligning cover arrangement comprising a carriage, the combination of:
(a) an internal carriage framework,
(b) a cover formed with forward, rearward, right and left side portions,
(c) engaging means formed in said cover,
(d) interlocking means fastened to said carriage framework and engageable with said engaging means for holding said cover in a rightward-leftward, forward-rearward aligned position with respect to said carriage framework, and (e) toggles between said cover and said carriage framework to force and hold said engaging means in engagement with said interlocking means to hold the cover firmly in alignment with said carriage framework.

13. A cover assembly for an office machine having a base portion including a framework and a carriage portion including a framework, comprising:
(a) a front cover for the base portion,
(b) a bottom cover for the base portion,
(c) a back cover for the base portion,
(d) a carriage cover, and
(e) means including first toggle means, latching means and second toggle means for holding said front and bottom covers to said base framework, said back cover to said base framework and said carriage cover to said carriage framework, respectively, to form a cover assembly that may be rapidly assembled and disassembled.

14. In a cover assembly, the combination of:
(a) a framework
(b) a cover,
(c) a bushing fastened to said framework, said bushing having a flanged portion,
(d) a cup carried by said cover,
(e) first and second resilient spacers on each side of the flanged portion of said bushing, said flanged portion and said spacers being contained within said cup,
(f) a retaining washer in contact solely with one of said spacers and said cup, and
(g) means on said cup, said means being engaged with said retaining washer to hold said spacers compressed between said flanged bushing and said cup to permit resiliency in all directions between the cover and the framework.

15. A mount for resiliently connecting a cover to a framework, comprising:
(a) a first mounting member,
(b) first and second resilient spacers adjacent said first mounting member,
(c) a second mounting member within which said first mounting member and said first and second resilient spacers are contained,
(d) a retaining member, and
(e) means on said second mounting member, said means being engaged with said retaining member for holding said retaining member against one of said spacers to maintain said mounting members, spacers and retaining member together as a unit prior to connection of said mount to said cover and to said framework.

References Cited by the Examiner
UNITED STATES PATENTS

| | | | |
|---|---|---|---|
| 1,818,790 | 8/31 | Chase | 235—63 |
| 1,957,496 | 5/34 | Friden | 235—63 |
| 2,567,133 | 9/51 | Studley | 235—1 |
| 2,598,342 | 5/52 | Boyden | 312—208 |
| 2,835,440 | 5/58 | Koch | 235—1 |
| 2,973,602 | 3/61 | Nessel | 248—2 |

FRANK B. SHERRY, *Primary Examiner.*